US011967796B2

(12) United States Patent
Itoh

(10) Patent No.: US 11,967,796 B2
(45) Date of Patent: Apr. 23, 2024

(54) HERMETIC CONNECTOR

(71) Applicant: SENIN TECHNOLOGIES CORPORATION, Tokyo (JP)

(72) Inventor: Ryo Itoh, Uji (JP)

(73) Assignee: SENIN TECHNOLOGIES CORPORATION, Tokyo (JP)

( * ) Notice: Subject to any disclaimer, the term of this patent is extended or adjusted under 35 U.S.C. 154(b) by 269 days.

(21) Appl. No.: 17/616,846

(22) PCT Filed: Jun. 8, 2020

(86) PCT No.: PCT/JP2020/022507
§ 371 (c)(1),
(2) Date: Dec. 6, 2021

(87) PCT Pub. No.: WO2020/246614
PCT Pub. Date: Dec. 10, 2020

(65) Prior Publication Data

US 2022/0311158 A1 Sep. 29, 2022

(30) Foreign Application Priority Data

Jun. 7, 2019 (JP) ................................ 2019-107339

(51) Int. Cl.
*H01R 9/16* (2006.01)
*H01R 43/20* (2006.01)

(52) U.S. Cl.
CPC ............... *H01R 9/16* (2013.01); *H01R 43/20* (2013.01)

(58) Field of Classification Search
None
See application file for complete search history.

(56) References Cited

U.S. PATENT DOCUMENTS 4,174,145 A * 11/1979 Oeschger ............ H01R 13/521 439/589
4,231,631 A 11/1980 Guerinault et al.
4,913,673 A * 4/1990 Kobler ................ H01R 13/405 439/736
5,109,594 A * 5/1992 Sharp .................... H01R 13/74 257/693
2004/0173370 A1* 9/2004 Deng .................... H01B 17/30 174/50.5

FOREIGN PATENT DOCUMENTS

JP S57-058702 Y 12/1982
JP S61-4368 U 1/1986
JP 2004-087246 A 3/2004
JP 2006-040766 A 2/2006
JP 2013-089313 A 5/2013

OTHER PUBLICATIONS

PCT/ISA/210, "International Search Report for International Application No. PCT/JP2020/022507," dated Aug. 18, 2020.

* cited by examiner

*Primary Examiner* — Oscar C Jimenez
(74) *Attorney, Agent, or Firm* — Manabu Kanesaka

(57) ABSTRACT

To realize a hermetic connector structure with a high product yield at a low cost, which prevents leakage certainly. A hole is formed in a partition in an insulating connector base portion, and a conductive portion is adhered to the surface of the partition and formed as an integrated member covering the hole.

5 Claims, 13 Drawing Sheets

(A)

(B)

HERMETIC CONNECTOR

RELATED APPLICATIONS

The present application is National Phase of International Application No. PCT/JP2020/022507 filed Jun. 8, 2020, and claims priority from Japanese Application No. 2019-107339, filed Jun. 7, 2019, the disclosure of which is hereby incorporated by reference herein in its entirety.

TECHNICAL FIELD

The present invention relates to a hermetic connector which can make an electrical connection through a conductive terminal while keeping airtightness.

BACKGROUND ART

Conventionally, a miniature electronic component is sealed in a vacuum or non-active gas atmosphere in an airtight manner for preventing corrosion of internal circuits by a high humidity and a malfunction of the internal circuits by changes in viscosity of the gas. A hermetic container is also used for operating electronic components in a vacuum, pressure, liquid or gas environment, and a hermetic connector having a high airtightness is used for introducing power and taking out an internal sensor signal without harming the airtightness of the hermetic container.

Patent Documents 1 and 2 disclose conventional hermetic connectors, wherein a through hole is formed in an insulating substrate, e.g., a ceramic board, a glass epoxy board, or in a metal board, which disconnects an internal atmosphere from an outer atmosphere, a metal pin is inserted in the through hole for an electric connection, the gap is closed by glass sealed treatment, silver alloy brazing or soldering, and they are bonded.

PRIOR ART DOCUMENT

Patent Document

Patent Document 1: Laid-Open Patent No. 2006-40766
Patent Document 2: Laid-Open Patent No. 2013-89313

DISCLOSURE OF INVENTION

Problems to be Resolved by the Invention

The airtightness of a hermetic connector for miniature electronic components is tested by an ultrafine leakage test at a level of $1\times10^{-15}$ Pa·m$^3$/s (He), a fine leakage test at a level of $1\times10^{-9}$ Pa·m$^3$/s (He) or the like. In the above-mentioned hermetic connectors according to the conventional technology, there is a problem that a good sealing cannot be guaranteed because of the bonding defects which could occur by brazing or soldering at the time of manufacturing, the occurrence of crazes by aged deterioration and so on. In a technology for bonding a metal pin to an insulating substrate by filling glass in the gap and melting it by heating to a high temperature instead of bonding by brazing or soldering, it is necessary to bond together three materials, i.e., a substrate, a metal pin and glass, which have different linear thermal coefficients of expansion, and gaps are likely caused between the substrate and glass and between glass and the metal pin because it has a boundary surface in the direction of the through hole, therefore it is difficult to prevent leakage certainly, the product yield is low, and it causes high costs in this kind of hermetic connectors.

Means for Solving the Problems

A hermetic connector according to claim 1 of the present invention is characterized as a hermetic connector for keeping an airtightness between a first space, in which a miniature electronic component is sealed together with a non-active gas, and a second space, which is outside the first space, for electrically connecting a first conductive portion in the first space with a second conductive portion in the second space, comprising a connector base portion, which is made of an insulating material, having a hole which communicates the first space with the second space and a partition which divides the two spaces by a portion other than the hole; and a first conductive portion which is adhered to a surface of the partition and formed as an integrated member for covering the hole.

By covering the hole with the conducive portion in this way, it is possible to close the hole for communicating the first space with the second space and thereby prevent leakage certainly. Here, the first conductive portion is characterized as being formed as an integrated member with respect to the portion for covering, and it is different from covering the hole by bonding using plural conductive members. It is because that the leakage from the joints is worried about if plural conductive members are used. For example, when a conductive portion is formed by repeating plating treatments multiple times with respect to the portion for covering the hole, it is to be the result in an integrated member or a single member. In this case, it is possible to prevent leakage effectively.

A hermetic connector according to claim 2 of the present invention is characterized as the first conductive portion which is adhered to the surface of the partition and thereby covers the hole and its periphery integrally. By configuring the hermetic connector in this way, as the contact area between the partition and the conductive portion becomes large, the conductive portion hardly peels off from the partition, and thereby the breaking strength of the hermetic connector improves.

Here, the first conductive portion is characterized as covering the hole and its periphery integrally. Even in this case, it is characterized as covering the portion to be covered by a single member and it is different from covering the hole by bonding using plural conductive members. It is because that leakage from the joint is worried about if plural conductive members are used. For example, when a conductive portion is formed by conducting plating treatments with different metals multiple times with respect to the portion for covering the hole, it will result in covering integrally by a single member. In this case, it is also possible to prevent leakage effectively.

A hermetic connector according to claim 3 of the present invention is characterized that the surface of the partition in the hermetic connector according to claim 1 has a second conductive portion which is formed being isolated from the first conductive portion, the first conductive portion has a shape which is suitable for connecting with a signal wire, the second conductive portion has a shape which is suitable for providing an electrostatic shield with respect to the first conductive portion, and thereby the hermetic connector functions as a coaxial connector.

A hermetic connector according to claim 4 of the present invention is characterized that the insulator part between the first conductive portion and the second conductive portion has a thin portion in the hermetic connector according to claim 3. By this configuration, it is possible to adjust the characteristic impedance by changing the gap size.

A hermetic connector according to claim 5 of the present invention is characterized that, in the hermetic connector according to either one of claims 1, 2, 3 and 4, the connector body portion is a molded object made of a synthetic resin, the conductive portion is a metal plated portion, and an airtightness and a conductivity are provided between the first space and the second space by a portion of the first conductive portion which corresponds to the hole.

Effect of Invention

According to the present invention, it is possible to realize a hermetic connector structure which prevents leakage certainly with a high product yield at a low cost.

A MODE FOR IMPLEMENTING THE INVENTION

Figure 1:
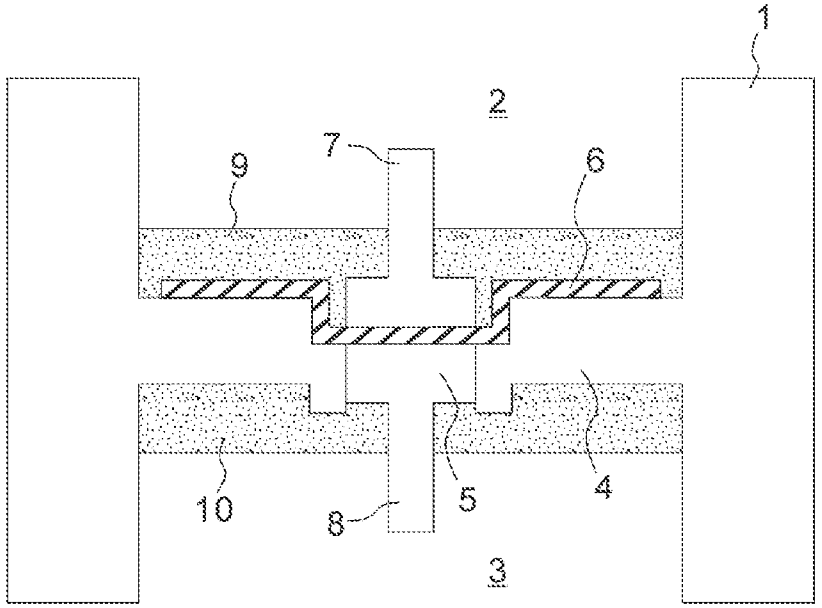
FIG. 1 (A) shows a cross-sectional schematic view of a first embodiment of a hermetic connector according to the present invention, and (B) shows a modification of the embodiment shown in (A).
Figure 1:
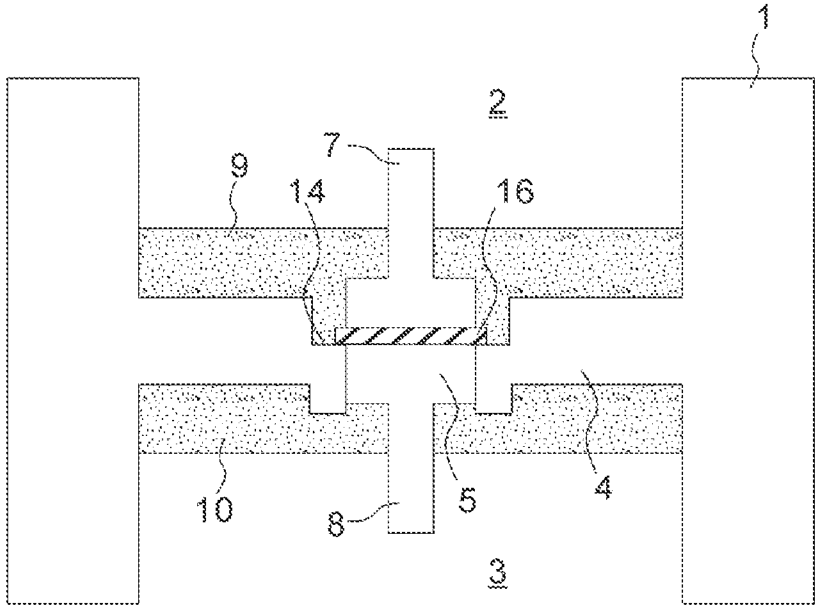

One embodiment according to the present invention will be explained below referring to the drawings. FIGS. 1(A) and 1(B) show cross sectional schematic views of one embodiment of a hermetic connector according to the present invention. In FIG. 1(A), a connector base portion 1 made of an insulating material is molded by polyester liquid crystal polymer (LCP), for example, and it has a partition 4 for separating a first space 2 from a second space 3. Appropriate fillers can be included when the connector base portion 1 is molded for improving the mechanical characteristic of liquid crystal polymer (LCP). One space is a vacuum, pressure, liquid or gas environment, for example, and electronic components are stored in the other space.

Hermetic connectors are utilized in the aerospace industry, the space industry, the defense industry, and many other industrial fields, such as air conditioner compressors, gas sensors, flow rate sensors, sensors for medical use. The outer shape of the connector base portion 1 has a substantially cylindrical shape, a substantially rectangular shape or the like depending on the usage of the hermetic connectors. A hole 5 is formed on the partition 4, and the hole 5 and its periphery are covered by a conductive plated portion 6 made of copper having a thickness of approximately 25 μm, for example. In this example, the plated portion 6 is formed on almost the entire surface of the partition 4.

A pin 7 is brazed to one surface of the portion of the plated portion 6 which covers the hole 5, and a pin 8 is brazed to the other surface. The pins 7 and 8 are members for electrical connection, in which, for example, a gold plating treatment or a tin plating treatment is conducted on the surface of a base member made of pure copper, brass, phosphor bronze, or the like. The brazing is conducted by soldering, silver brazing, gold tin (AuSn) bonding by high frequency induction heating (IH). If a LCP material causes leakage, it is possible to form sealing portions 9, 10 which are made of epoxy resin, epoxy resin impregnated or acrylic resin impregnated. In this way, a hermetic connector according to the present embodiment has a structure which keeps an airtightness and makes an electrical connection by the plated portion 6. Particularly, because the plated portion 6 is formed for covering the hole 5 and its periphery, the contact area between the partition 4 and the plated portion 6 becomes large, the plated portion 6 hardly peels off from the partition 4 when a force is applied to the pins 7 and 8, and thereby the mechanical strength of the hermetic connector improves. The plated portion 6 is adhered to the partition 4 and is formed as an integrated or a single member with respect to the entire portion which covers the hole 5. Even when the plated portion is formed in which the thickness is increased by adding electroplating to electroless plating, the plated portion 6 is formed as an integrated member or a single member.

FIG. 1(B) shows a modified example of the hermetic connector shown in FIG. 1(A). In this example, a plated portion 16 is formed to cover the hole 5 in a recess 14 of the partition 4. The plated portion 16 is adhered to the recess 14 and forms an integrated member or a single member with respect to the entire portion which covers the hole 5. Even when the plated portion is formed in which the thickness is increased by adding electroplating to electroless plating, it is formed as an integrated member or a single member. By covering the hole 5 with the plated portion 16, it is possible to close the hole 5 which communicates the first space 2 with the second space 3, and thus it is possible to prevent leakage certainly. Next, a method for manufacturing the hermetic connector shown in FIG. 1(A) will be explained referring to FIGS. 2-4. As a first step, the connector base portion 1 having the hole 5 is formed by molding a ceramic or a synthetic resin, e.g., LCP (Liquid Crystal Polymer), PPA, PA, a thermosetting resin. For the connector base portion 1, a base material which is composed by a synthetic resin, e.g., a thermoplastic resin, a thermosetting resin, or an inorganic material, e.g., a ceramic, glass, can be used.

Preferably, the synthetic resin is aromatic liquid crystal polymer, polysulfone, polyetherpolysulfone, polyacryl sulfone, polyether imide, polyester, acrylonitrile butadiene styrene copolymer, polyamide, modified polyphenylene oxide resin, polynorbornene resin, phenolic resin, epoxy resin, polyphenylene sulfide resin (PPS resin), polybutylene terephthalate (PBT) resin, or the like. More preferably, the synthetic resin is polyester liquid crystal polymer, because it has a heat-resisting property and a thermal expansion coefficient which are similar to those of metals under wide-range temperature conditions, also has an equal stretchability to those of a metal membrane and has an excellent characteristic equal to a metal membrane in a thermal cycle test. Fillers like glass fibers, calcium pyrophosphate, wollastonite, calcium carbonate, barium titanate, carbon fibers, quartz fibers, barium sulfate, or the like, can be added to the synthetic resin.

Figure 2:
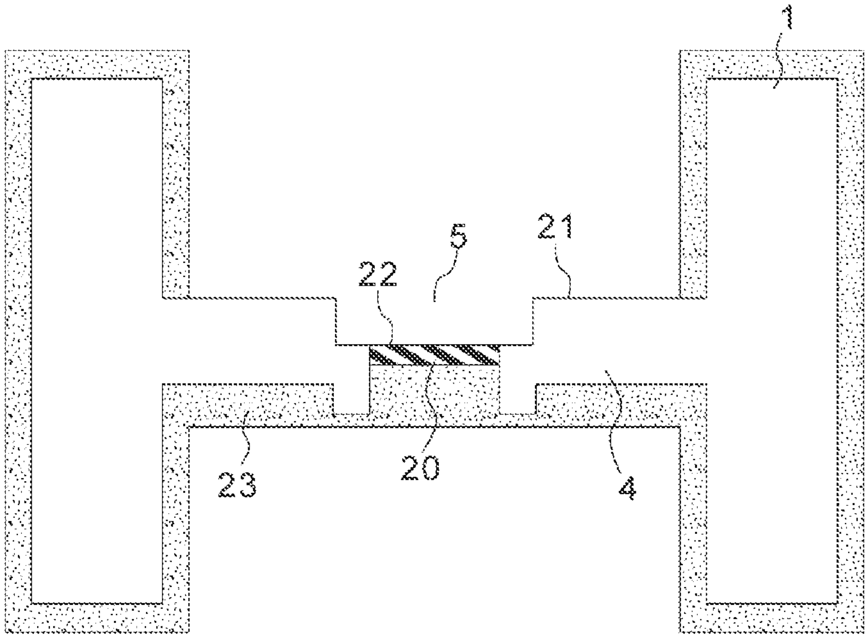
FIG. 2 shows a cross-sectional schematic view of the first step of a manufacturing process for the hermetic connector according to the embodiment shown in FIGS. 1(A) and 1(B).

First, the exposed surface of the partition 4 made of Liquid Crystal Polymer (LCP) is roughened by etching. Next, as shown in FIG. 2, a molded body 20 is formed for closing the hole 5 using acrylonitrile-butadiene-styrene (ABS) resin, biodegradable resin, or the like. Here, as a material of the connector base portion 1, a material, which is insoluble by an organic solvent for dissolving the molded body 20, is selected. Then, after degreasing the exposed surface 21 of the partition 4 and the exposed surface 22 of the molded body 20, the exposed surfaces 21 and 22 are roughened using a chromic acid solution, a kalium hydroxide (KOH) solution, or the like.

As a method for roughening the surfaces, publicly known etching methods are applicable, for example. There are wet type and dry type etching methods, and a suitable etching method can be employed depending on the type of the material which is used for the substrate. The dry type etching method can be conducted by radiating plasma or using gas, for example.

The wet type etching method can be conducted by using an alkali metal hydroxide water solution, e.g., NaOH, KOH, an alkali metal alcoholate water solution, e.g., alcoholic sodium, alcoholic potassium, or an organic solvent, e.g., dimethylformamide, and applying these etching solutions on the surface of the substrate or having the substrate immersed in these solutions. Among these, in a method for using a NaOH solution or a KOH solution, it is preferable to set the concentration to about 35-45 wt % and set the temperature to about 70-95° C. as the etching condition.

A method for using an alkali metal alcoholate water solution or an organic solvent, e.g., dimethylformamide is preferable in the case of roughening after coating the substrate with a water-soluble or hydrolysable high polymer material. When an organic solvent is used, it may happen that the substrate is just swollen but the substrate does not reach to a roughened condition. In this case, it is recommended to carry out an acid treatment or an alkali treatment after the treatment by an organic solvent.

Next, a masking forming step is performed for patterning. A mask layer 23 made of a polylactic acid (PLA) resin, for example, is formed on the surface of the connector base portion 1 and the molded body 20 which is other than the portion where the plated portion 6 is to be formed, as shown in FIG. 2.

As the second step, a plating catalyst, e.g., Pd, Pt, is applied to the exposed surface 21 of the partition 4 and the exposed surface 22 of the molded body 20 by having them immersed in an accelerator liquid, e.g., sulfuric acid, hydrochloric acid, sodium hydroxide, ammonium. Publicly known plating catalysts can be used, and most especially, it is preferable to use a plating catalyst including Pd or Pt, and it is used as inorganic salt like chlorides, for example. The plating catalyst is applied by having the above-mentioned catalyst metal precipitated by an accelerator treatment after the above-mentioned inorganic salt is deposited on the substrate. It is possible to deposit the inorganic salt on the substrate by having the substrate contacted to an inorganic salt solution, and it is carried out by having the substrate immersed in the inorganic salt solution or applying the solution to the substrate, for example.

Although the specific condition cannot be determined unconditionally because it varies depending on the material of the substrate, the material of plating, the material of the plating catalyst, the method for depositing the inorganic salt, an example can be given as described below when palladium chloride is used as the plating catalyst salt and an immersion method is employed.

Catalyst Salt Solution Composition

PdCl2.2 H2O:0.1~0.3 g/dm3

SnCl2.2 H2O:10~20 g/dm3

HCl:150~250 cm3/dm3

Immersion Condition

Temperature: 20-45° C.

Time: 1-10 minutes

Figure 3:
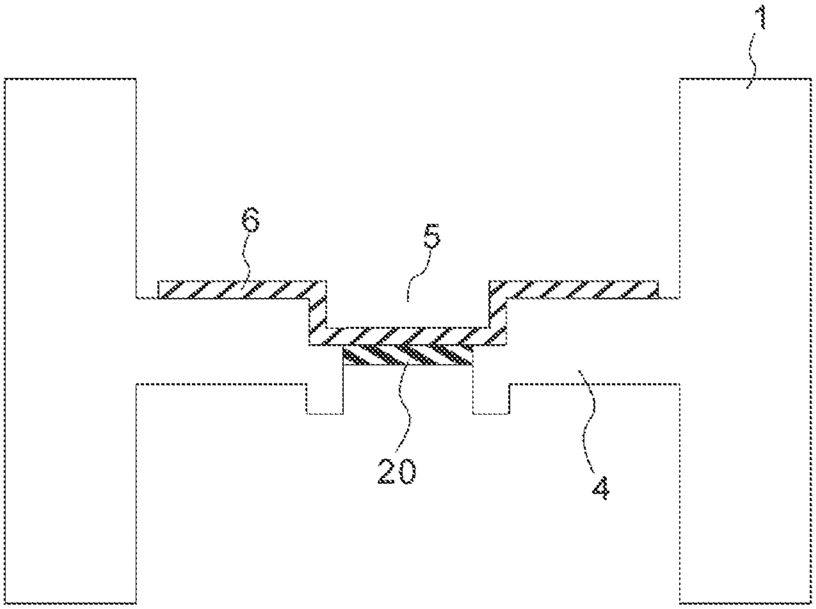
FIG. 3 shows a cross-sectional schematic view of the second step of a manufacturing process for the hermetic connector according to the embodiment shown in FIGS. 1(A) and 1(B).

As a solvent for the plating catalyst salt solution, it is possible to use an organic solvent which does not have the above-mentioned coating material made of a water-soluble or hydrolysable high polymer material eluted completely (it may be partially eluted), e.g., methanol, ethanol, isopropyl alcohol, in addition to the above-mentioned hydrochloric acid. The mask layer 23 made of PLA resin is dissolved at the accelerator step. Next, the electroless plating of copper (Cu) is carried out on the exposed surfaces 21 and 22, and the plated portion 6 is formed, as shown in FIG. 3. Further, the electroplating of, e.g., Cu, Au, can be added to the electroless plated surface.

As the plating method, publicly known metalizing methods (electroless plating method and electro plating method) can be employed. Copper, nickel, gold and other metals can be given as the examples of the plating metal. The plating step can be conducted in plural divided steps. It is also possible to employ a preliminary plating step after the step for applying a catalyst. The preliminary plating step can be conducted by publicly known metalizing methods. Preferably, the preliminary plating method is an electroless plating method, and the metals which are similar to the above-mentioned metals for so-called main plating step can be used in the preliminary plating.

By employing the preliminary step, it is possible to make the plating quality in the main plating step better. It is possible to employ a post plating process. The post plating process can be conducted by a publicly known metalizing method, preferably an electroless plating method, and the metal for plating can be the same type as the metal in the main plating step or a type which is different form that in the main plating step. In this embodiment, the plated portion 6 is formed thicker by conducting an electroplating after the electroless plating.

Figure 4:
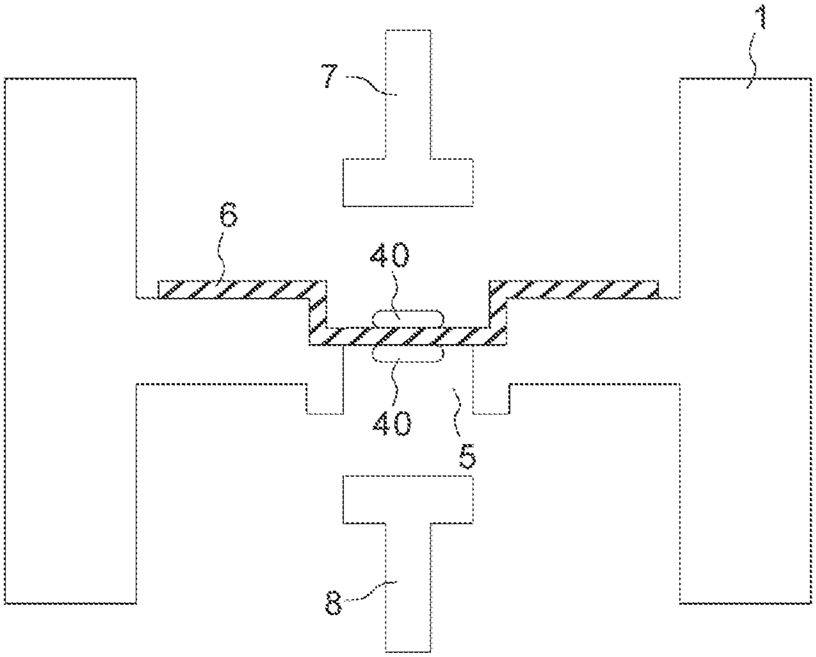
FIG. 4 shows a cross-sectional schematic view of the third step of a manufacturing process for the hermetic connector according to the embodiment shown in FIGS. 1(A) and 1(B).

As the third step, after the molded body 20 is removed by an organic solvent and an oxide film is removed, the plated membrane is made further thicker, and the pins 7 and 8 are bonded to the plated portion 6 in both sides of the portion which corresponds to the hole 5 by a solder 40 as shown in FIG. 4. After this step, the hermetic connector having the configuration shown in FIG. 1 is manufactured by the sealing portions 9 and 10 made of an epoxy resin as necessary. According to the hermetic connector which is configured as above-mentioned and shown in FIG. 1 (A), as the exposed surface 21 of the partition 4 is treated into a rough surface by etching, and the plated portion 6 is formed by carrying out the electroless plating and the electroplating, the plated portion 6 is securely fixed to the surface of the partition 4, the contact area between the plated portion 6 and the partition 4 becomes large, and the plated portion 6 hardly peels off from the partition 4, and thereby the breaking strength of the hermetic connector is improved.

Figure 5:
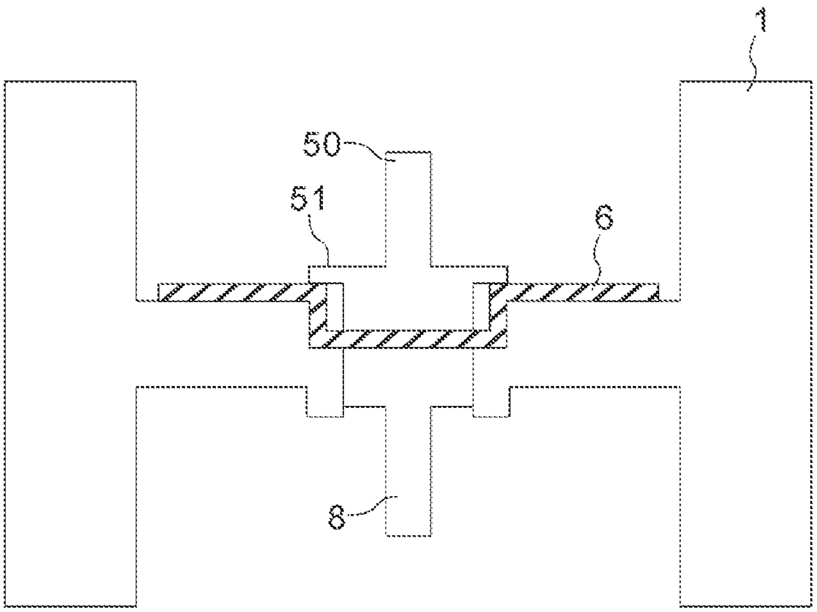
FIG. 5 shows a cross-sectional schematic view of a second embodiment of a hermetic connector according to the present invention.
Figure 6:
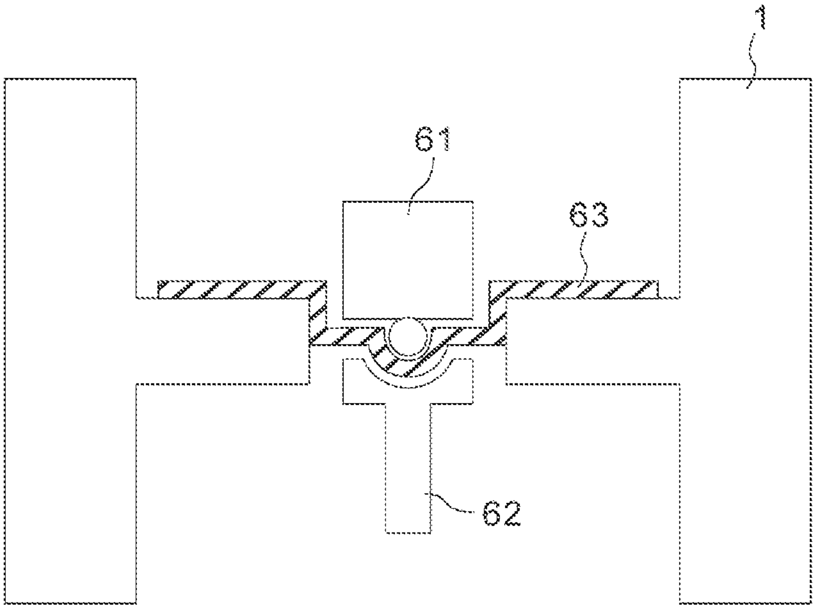
FIG. 6 shows a cross-sectional schematic view of a third embodiment of a hermetic connector according to the present invention.
Figure 7:
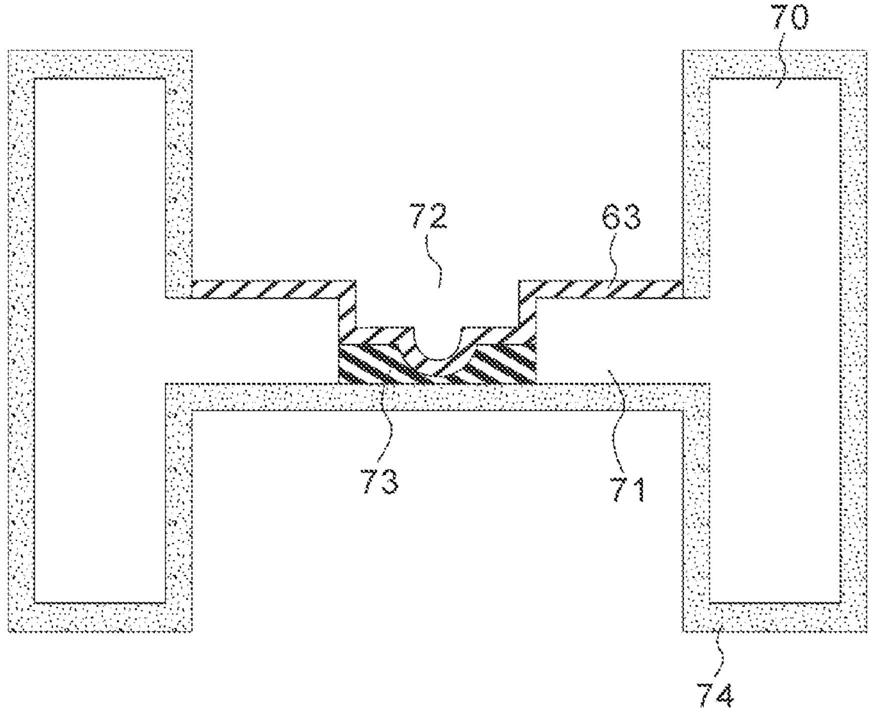
FIG. 7 shows a cross-sectional schematic view of the first step of a manufacturing process for the hermetic connector according to the embodiment shown in FIG. 6.
Figure 8:
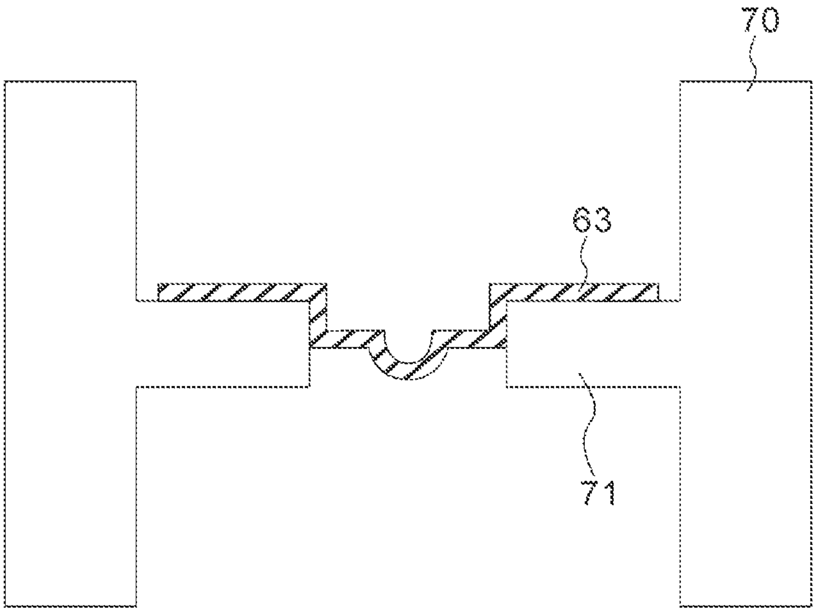
FIG. 8 shows a cross-sectional schematic view of the second step of a manufacturing process for the hermetic connector according to the embodiment shown in FIG. 6.

In a method for manufacturing the hermetic connector shown in FIG. 1(B), although the extent in which the mask layer for patterning is formed and the extent in which the plated portion is formed are different from those of the hermetic connector shown in FIG. 1 (A), other processes are the same. In the hermetic connector manufactured in this way, it is possible to close the hole 5 which communicates the first space 2 with the second space 3 by covering the hole 5 with the plated portion 16, and thereby it is possible to certainly prevent leakage. In the hermetic connector according to a second embodiment of the present invention, as shown in FIG. 5, one of the pins, i.e., a pin 50 has a flange portion 51, and the flange portion 51 is bonded and firmly adhered to the plated portion 6 by silver brazing, soldering, AuSn bonding, for example, and thereby it is possible to make it stable against external forces. In the hermetic connector according to the third embodiment of the present invention, as shown in FIG. 6, the shape of a plated portion 63 is changed to a shape which is different from that of the plated portion 6 shown in FIG. 1 corresponding to the shape of the bonding portion of components 61 and 62 which are to be bonded. In this example, the center portion of the plated portion 63 is bent in a substantially semi-spherical shape. It is possible to prevent leakage certainly in a hermetic connector even when the plated portion 63 has such a shape. Next, a method for manufacturing the hermetic connector shown in FIG. 6 will be explained referring to FIGS. 7 and 8. As a first step, in FIG. 7, first of all, a hole 72 is formed on a partition 71 of a connector base portion 70. Next, a molded body 73 for closing the hole 72 is formed. A recess in a substantially semi-spherical shape is formed on the exposed surface of the molded body 73. The surfaces of the connector base portion 70 and the molded body 73, which are other than the portion where the plated portion 63 is formed, are covered by a mask layer 74 made of a polylactic acid (PLA) resin. After this treatment, a plating catalyst is applied. At this time, the mask layer 74 is dissolved. Namely, the mask layer 74 is dissolved and removed before the molded body 73 is dissolved and removed. The selected surfaces of the connector base portion 70 and the molded body 73 are roughened by etching. After this treatment, an electroless etching and an electroplating are conducted and then the plated portion 63 is formed. Next, the plated portion 63, which is firmly bonded to the surface of the partition 71, is obtained as shown in FIG. 8 by removing the molded body 73. After removing the molded body 73, the thickness of the plated film is increased by additionally conducting an electroplating.

Although it is possible to form the molded body 73 after etching the partition 71, only the molded body 73 is etched in this case. For example, if chromic acid is used, only the molded body 73 made of an ABS resin is etched. At this time, the connector base portion 70 made of LCP is not etched.

Figure 9:
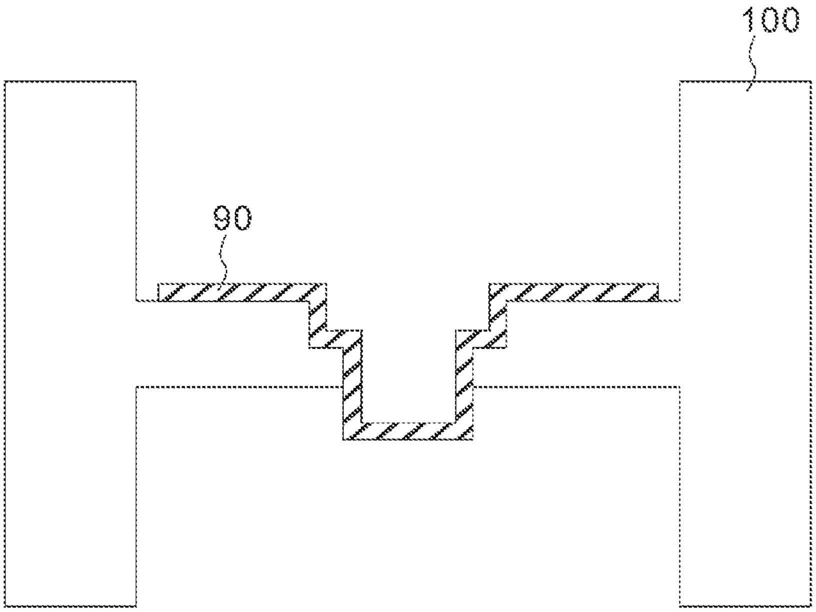
FIG. 9 shows a cross-sectional schematic view of a fourth embodiment of a hermetic connector according to the present invention.
Figure 10:
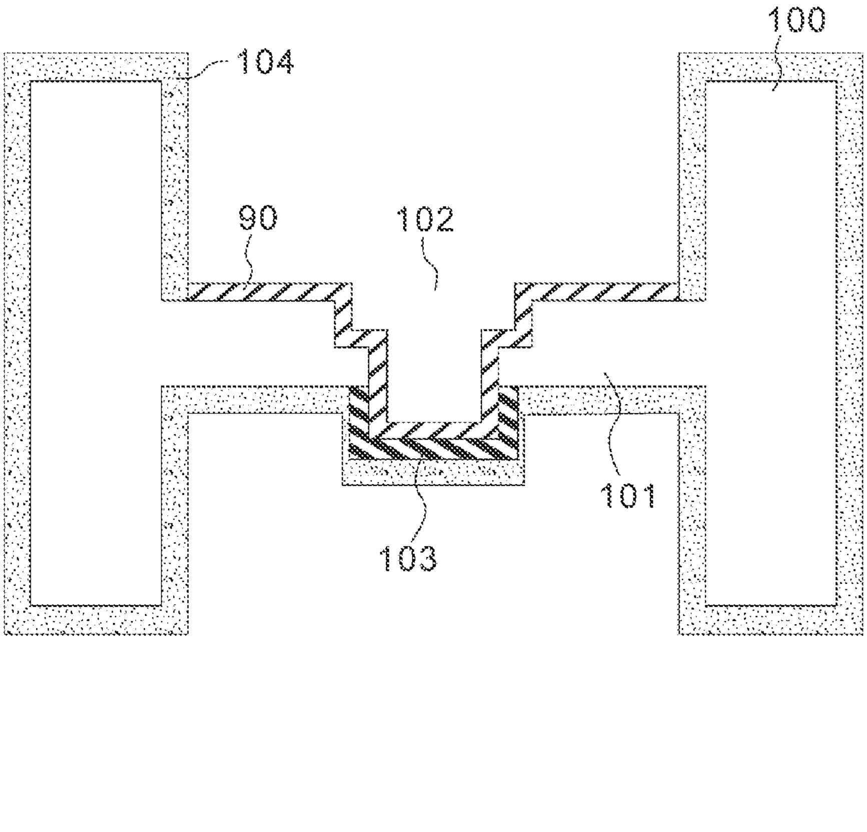
FIG. 10 shows a cross-sectional schematic view of the plated portion forming step of a manufacturing process for the hermetic connector according to the embodiment shown in FIG. 9.

In the hermetic connector according to a fourth embodiment of the present invention, as shown in FIG. 9, a plated portion 90 has a shape which is suitable for connecting to components having a rectangular cross section. As shown in FIG. 10, as a connector base portion 100, a partition 101 having a hole 102 is formed. Next, a molded body 103 having a rectangular cross section is formed in the vicinity of the hole 102. A mask layer 104 for patterning is formed by a polylactic acid (PLA) resin or the like on the surface of the connector base portion 100 and the surface of the molded body 103 which are other than the portion where the plated portion 90 is formed.

A roughening treatment is conducted on the exposed surfaces of the partition 101 and the molded body 103 by etching. The plated portion 90 is formed in a form of a thick film by applying a plating catalyst and conducting an electroless plating and an electroplating. The mask layer 104 is dissolved and removed when the catalyst is applied. Next, the plated portion 90, which is firmly adhered to the surface of the partition 101 as shown in FIG. 9, is obtained by removing the molded body 103. It is possible to obtain the plated portion 90 having a thicker film by conducting electroplating even after dissolving and removing the molded body 103.

The materials for forming the plated portion in the second through fourth embodiments shown in FIGS. 5-10 are similar to those which are used for forming the plated portion 6 according to the first embodiment. Also, it is possible to form a plated portion having a desired shape, which is other than the shapes shown in the above-mentioned embodiments, corresponding to the components stored in the hermetic connector.

Figure 11:
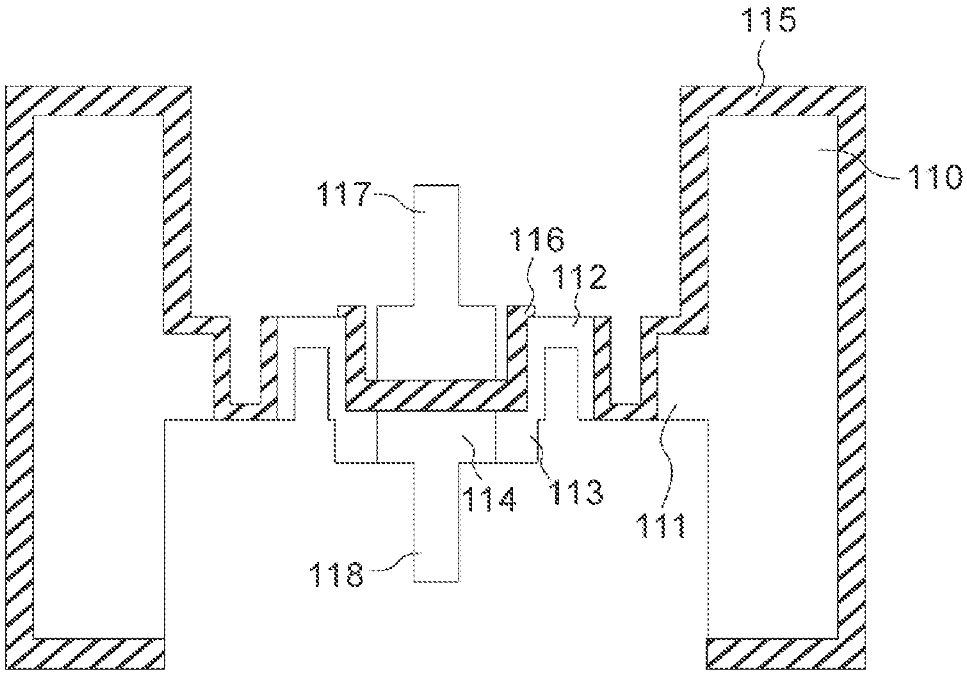
FIG. 11 shows a cross-sectional schematic view of a fifth embodiment of a hermetic coaxial connector according to the present invention.

Next, the configuration of the hermetic connector according to a fifth embodiment of the present invention will be explained referring to FIG. 11. The hermetic connector according to this embodiment is one example of a hermetic coaxial connector having an axial structure which is suitable for transmission of high frequency signals. In FIG. 11, the connector base portion 110 made of an insulating material has an outer partition 111, an intermediate partition 112 and an inner partition 113, and a hole 114 is formed in the central part of the connector base portion 110.

A plated portion 115 is formed on the surface of the outer wall portion of the connector base portion 110 and the outer partition 111 for connecting to the external conductor of a coaxial cable which is not shown in the drawings. The plated portion 115 is grounded at an appropriate position for providing an electrostatic shield. A plated portion 116 is formed on the hole 114 and a part of the inner partition 113 which is in the periphery of the hole 114. The plated portion 115 and the plated portion 116 are electrically isolated by the intermediate partition 112 and the inner partition 113 which are made of an insulating material.

A pin 117 and a pin 118 are respectively bonded to each of both sides of the part of the plated portion 116 which covers the hole 114, and for example, one of the pins is to be connected to a female contact pin or the inner conductor of a coaxial cable which is integrated with the connector base portion.

A hermetic connector according to the present invention is not limited to the above-mentioned structure and is also applicable to a high-speed signal wire, which is integrated with a female contact pin or a connector base portion, or a structure where the inner central conductor of a coaxial connector is integrated with the circuit in a circuit board in addition to the single connector.

Figure 12:
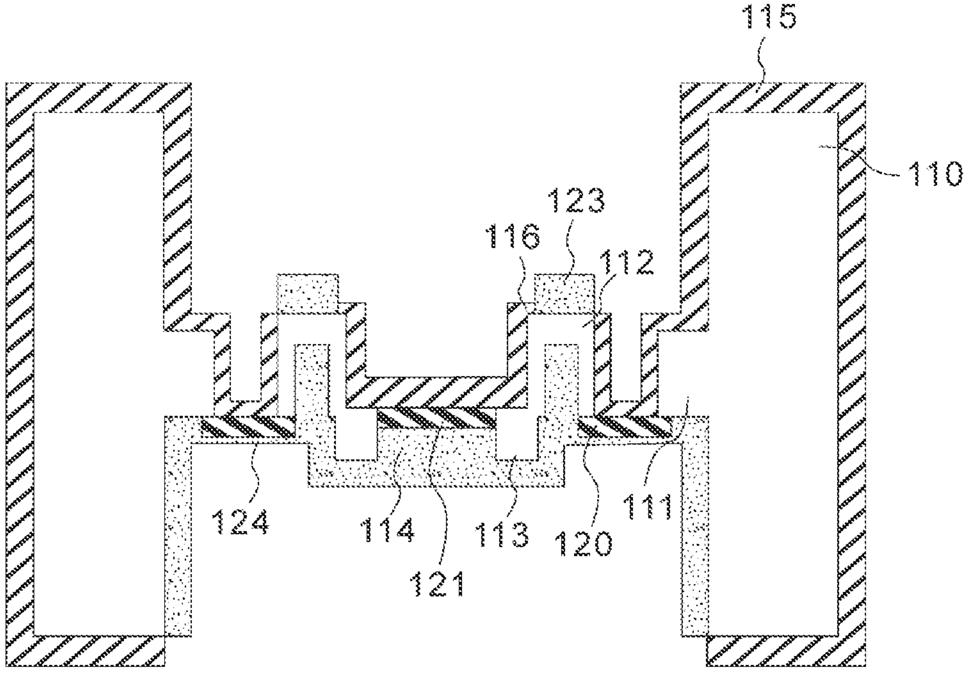
FIG. 12 shows a cross-sectional schematic view of the plated portion forming step of a manufacturing process for the hermetic coaxial connector according to the embodiment shown in FIG. 11.

Next, a forming step of the plated portions 115 and 116 in a method for manufacturing the hermetic coaxial connector will be explained referring to FIG. 12. In FIG. 12, first of all, the connector base portion 110 having the outer partition 111, the intermediate partition 112, the inner partition 113 and hole 114 are formed by molding a ceramic or a synthetic resin, e.g., LCP (Liquid Crystal Polymer), PPA, PA, a thermosetting resin. A first molded body 120 is formed so as to stride across the outer partition 111 and the intermediate partition 112 using an ABS resin or the like. A second molded body 121 for closing the hole 114 is also formed using an ABS resin or the like.

A mask layer 124 made of a polylactic acid (PLA) resin or the like for patterning is formed on the surface of the connector base portion 110, which is other than the portion where the plated portions 115 and 116 are formed, and on the surfaces of the first molded body 120 and the second molded body 121. Next, a roughening treatment is conducted by etching. After this treatment, the plated portions 115 and 116 are formed by applying a plating catalyst and conducting an electroless plating and an electroplating. The mask layer 124 is dissolved and removed when the plating catalyst is applied.

Next, the plated portions 115 and 116 which are firmly adhered to the surfaces of the outer wall portion, the outer partition 111, a part of the intermediate partition 112, the inner partition 113 of the connector base portion 110 are obtained. The surface of the intermediate partition 112 includes a portion which are not plated, the plated portion 115 and the plated portion 116 are electrically isolated, and the plated portion 115 and the plated portion 116 respectively correspond to the outer conductor and the inner conductor of the coaxial connector.

Accordingly, the hermetic coaxial connector according to the fifth embodiment shown in FIG. 11 is manufactured by a method which is similar to the manufacturing method which are explained with regard to the first embodiment shown in FIGS. 1-4. In this embodiment, it is also possible to prevent leakage certainly at the hole 114 and the partitions, because the exposed surfaces of the outer partition 111, the intermediate partition 112 and the outer partition 113 are roughened by etching, the plated portions 115 and 116 are formed by electroless plating, and thereby the plated portions 115 and 116 are firmly fixed to the surfaces of these members and the contact area between the plated portion 115 and the outer partition 111, the contact area between the plated portion 115 and the intermediate partition 112, the contact area between the plated portion 116 and the intermediate portion 112, and the contact area between the plated portion 116 and the inner partition 113 become large.

In a coaxial connector, although it is generally necessary to adjust the characteristic impedance for taking impedance matching, it is possible to adjust the impedance in the configuration according to the fifth embodiment as described below.

Figure 13:
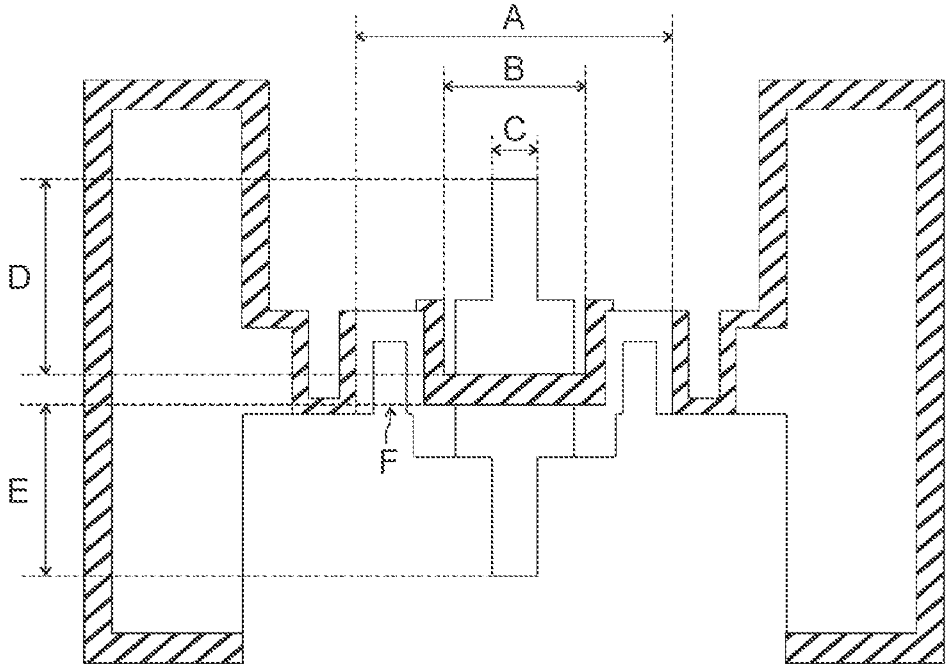
FIG. 13 shows a cross-sectional schematic view for explaining a characteristic impedance adjustment in the hermetic coaxial connector according to the embodiment shown in FIG. 11.

As shown in FIG. 13, in the hermetic coaxial connector, it is possible to adjust the characteristic impedance by setting the length A between the outer walls of the intermediate partition 112, the length B between the inner walls of the plated portion 116 which is formed in the hole 114, the outer diameter C of the pin 117, the length D of the pin 117, the length E of the pin 118, and the size F of the gap which is formed in the intermediate partition 112 to appropriate values, for example.

It is effective for adjusting the characteristic impedance to adjust the size F of the gap which is formed in the intermediate partition 112 because the dielectric constants are largely different between a synthetic resin like LCP material and vacuum or air. It is also possible to adjust the characteristic impedance by changing a portion which is other than the above-mentioned portion and its size.

It is also possible to use hermetic connectors according to the above-mentioned embodiments for various usages regardless of the size. Especially, it is possible to use the hermetic coaxial connectors preferably for smartphones conforming to the 5G communication standard and high frequency circuit boards into which coaxial connectors (central conductor circuit boards) are integrally formed.

In a hermetic connector according to one embodiment of the present invention, it is possible to realize a structure for preventing leakage certainly at a low cost without needs for complicated adjustments. It is also possible to realize a structure of a hermetic coaxial connector which enables easy impedance adjustments, and it is further possible to realize an integrated structure of a coaxial connector and a circuit board which eliminates connections by soldering in a coaxial connector.

EXPLANATION OF REFERENCES

1 connector base portion
2 first space
3 second space
4 partition
5 hole
6 plated portion
7 pin
8 pin
9 sealing portion
10 sealing portion
14 recess
16 plated portion
20 molded body
21 exposed surface of partition
22 exposed surface of molded body
23 mask layer
50 pin
51 flange portion
61 component
62 component
63 plated portion
70 connector base portion
71 partition
72 hole
73 molded body
74 mask layer
90 plated portion
100 connector base portion
101 partition
102 hole
103 molded body
110 connector base portion
111 outer partition
112 intermediate partition
113 inner partition
114 hole
115 plated portion

116 plated portion
117 pin
118 pin
120 first molded body
121 second molded body
123 mask layer
124 mask layer

The invention claimed is:

1. A hermetic connector for keeping an airtightness between a first space and a second space and electrically connecting a first conductive member in the first space and a second conductive member in the second space, comprising:

an insulating connector base portion having a hole which communicates the first space with the second space, and a partition which is formed at a portion other than the hole and through which the first space and the second space are divided; and a first metal plated portion which is adhered to a surface of the partition and formed as an integrated member for covering the hole.

2. The hermetic connector according to claim 1, wherein the first metal plated portion is adhered to the surface of the partition for covering the hole and its periphery integrally.

3. The hermetic connector according to claim 1, further comprising a second metal plated portion which is formed on the surface of the partition isolating from the first metal plated portion, wherein the first metal plated portion has a shape which is suitable for connecting a signal wire; and the second metal plated portion has a shape which is suitable for providing an electrostatic shield with respect to the first metal plated portion.

4. The hermetic connector according to claim 3, further comprising an insulator part formed between the first metal plated portion and the second metal plated portion and having a thin portion.

5. The hermetic connector according to claim 1, wherein the connector base portion is a molded object made of a synthetic resin;

and the airtightness and a conductivity are provided between the first space and the second space by a portion of the first metal plated portion which corresponds to the hole.

* * * * *